April 23, 1957 O. R. SCHOENROCK 2,789,446
VARIABLE-TORQUE DISTRIBUTING TRANSMISSIONS
Filed Aug. 18, 1952 7 Sheets-Sheet 3
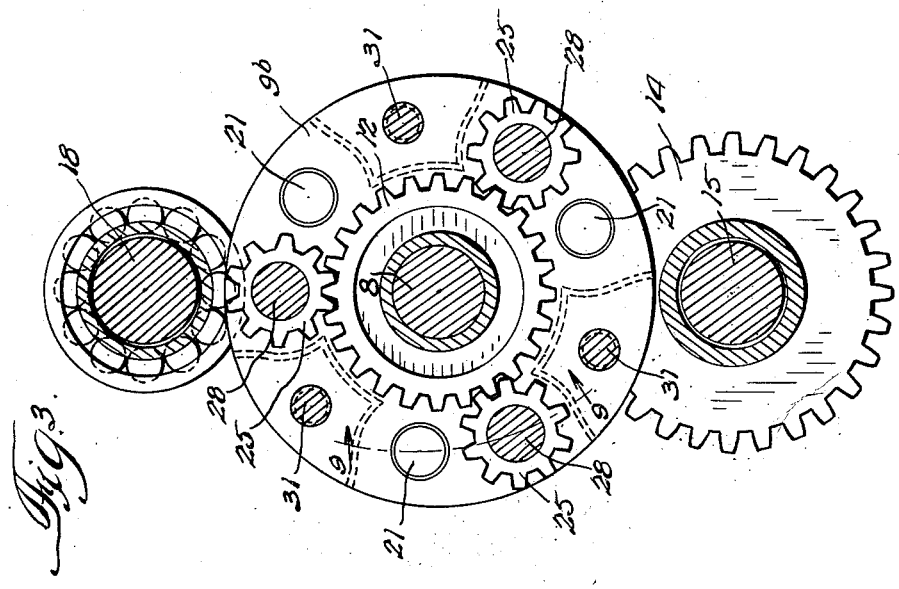
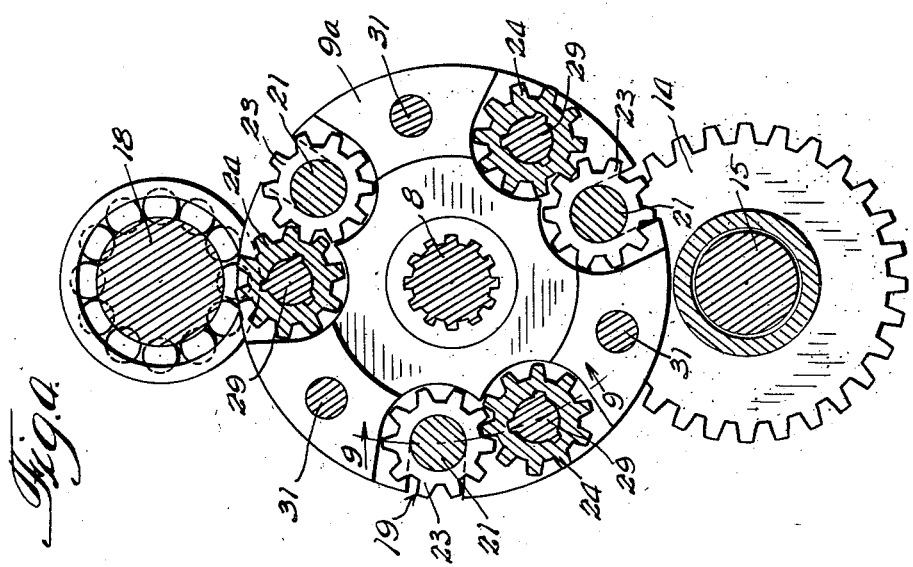
Inventor.
Otto R. Schoenrock.

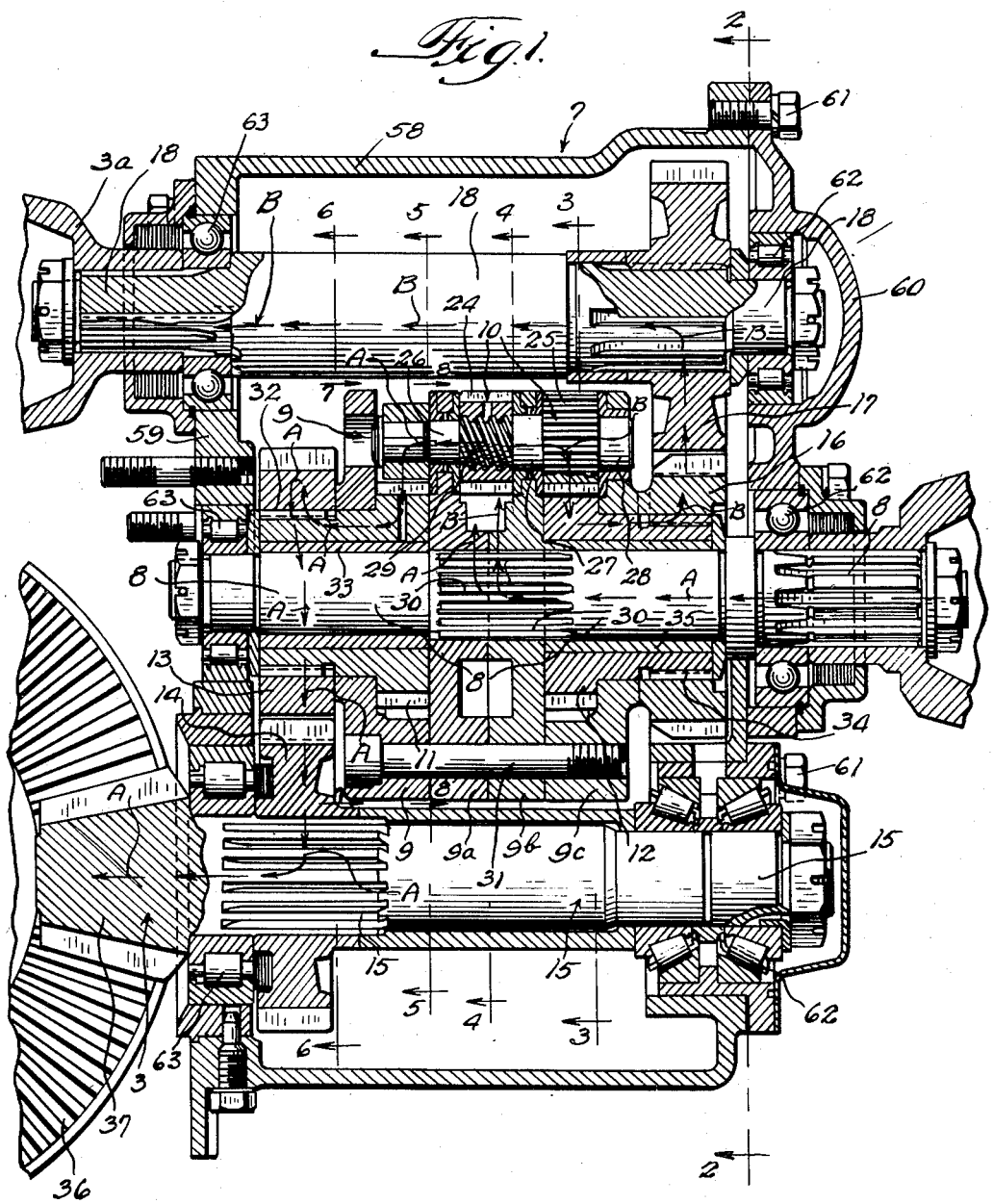

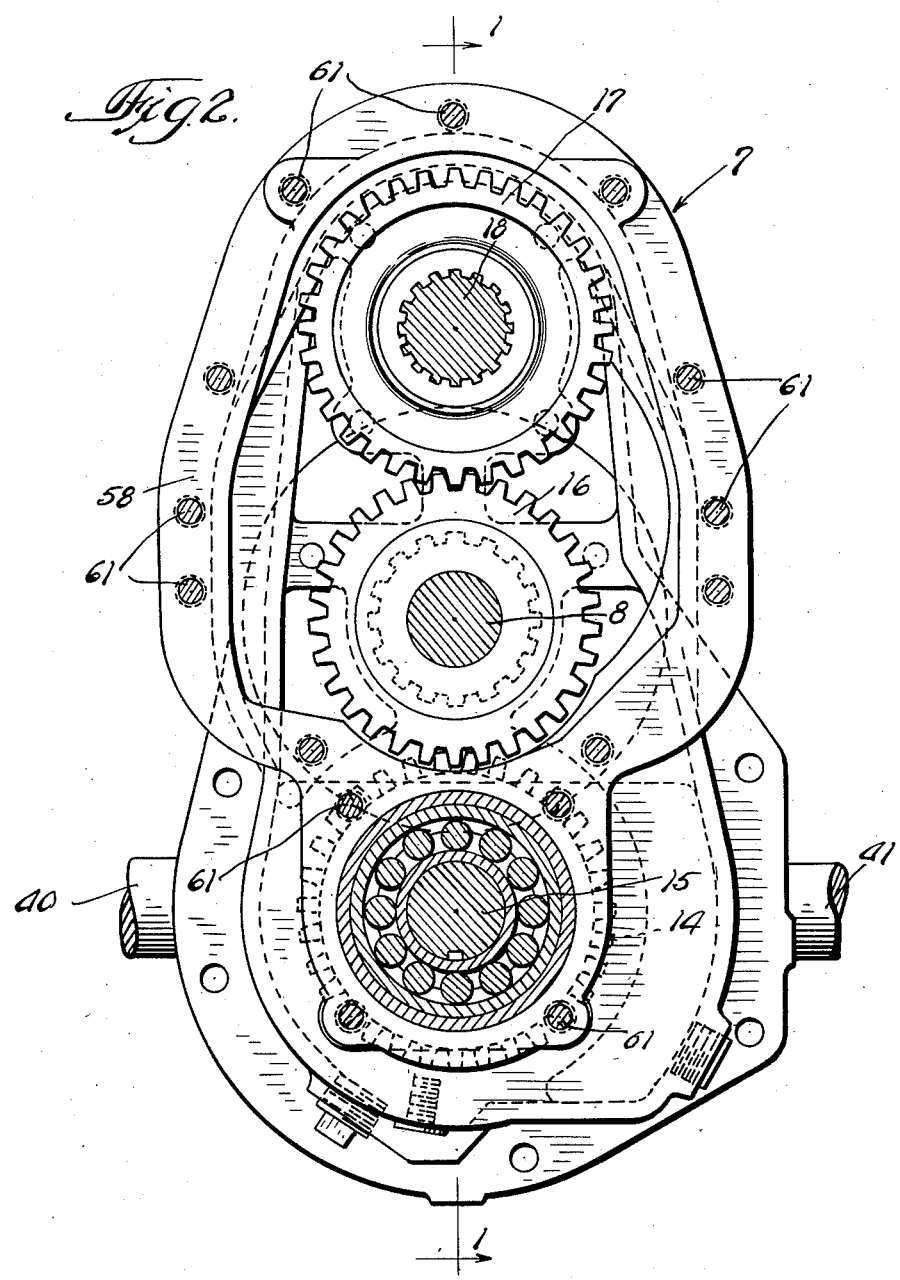

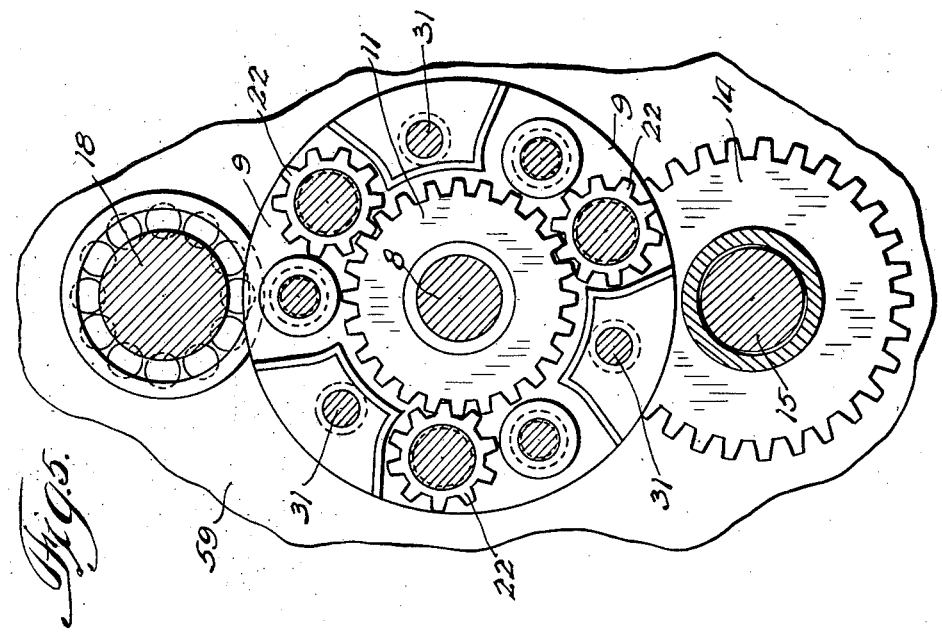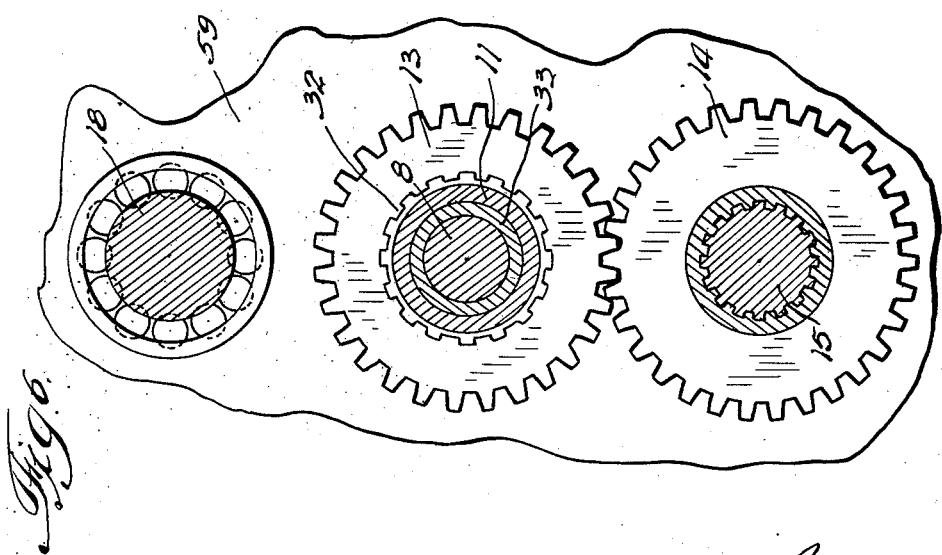

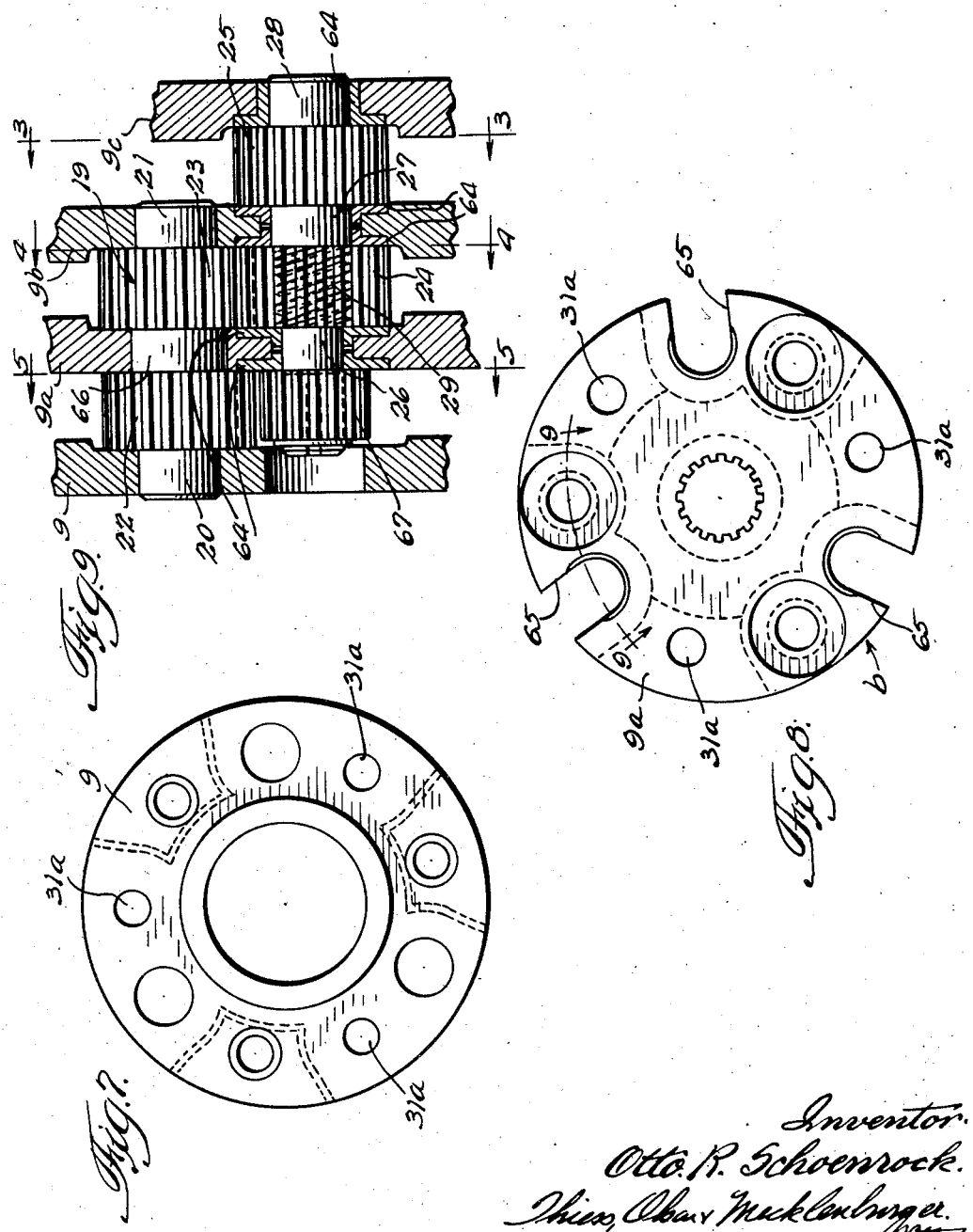

April 23, 1957 O. R. SCHOENROCK 2,789,446
VARIABLE-TORQUE DISTRIBUTING TRANSMISSIONS
Filed Aug. 18, 1952 7 Sheets-Sheet 6

INVENTOR.
Otto R. Schoenrock
BY
Thiess, Olson & Mecklenburger
Attys.

April 23, 1957     O. R. SCHOENROCK     2,789,446
VARIABLE-TORQUE DISTRIBUTING TRANSMISSIONS
Filed Aug. 18, 1952     7 Sheets-Sheet 7
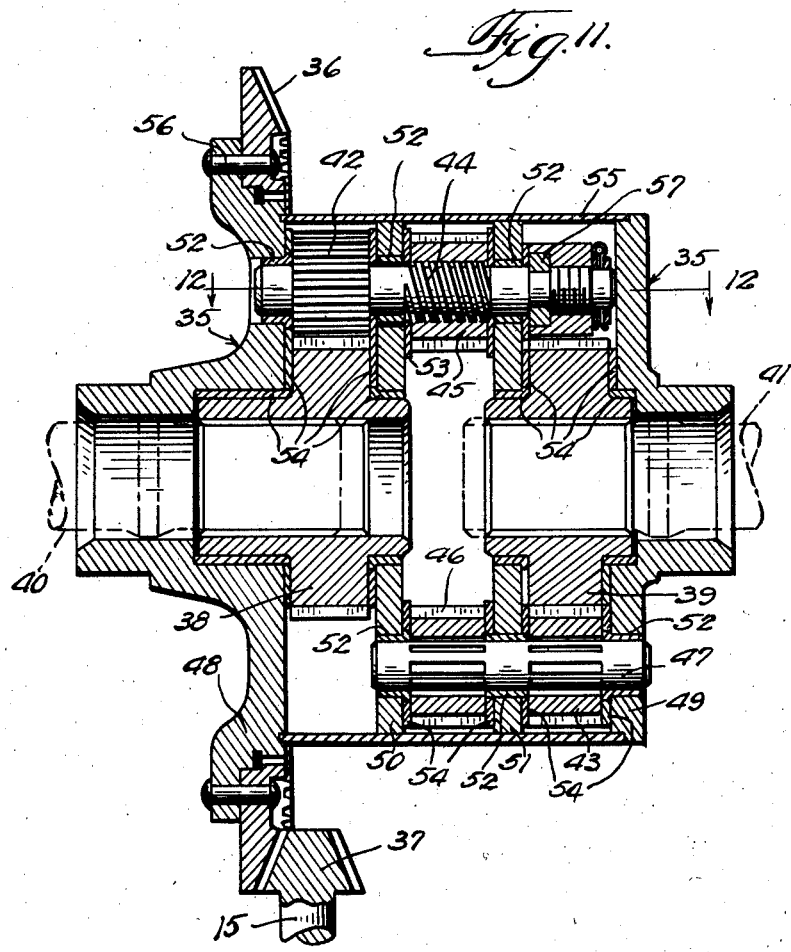
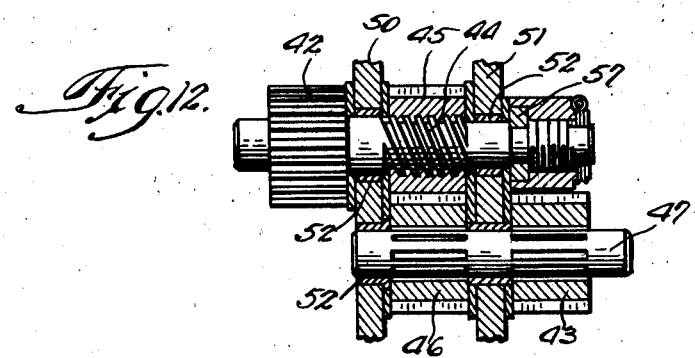
INVENTOR.
Otto R. Schoenrock
BY
Thiess, Olson & Mecklenburger
Attys.

United States Patent Office 2,789,446
Patented Apr. 23, 1957

2,789,446

VARIABLE-TORQUE DISTRIBUTING TRANSMISSIONS

Otto R. Schoenrock, Oak Park, Ill., assignor to Dualoc Engineering Co., Rockford, Ill., a corporation of Illinois Application August 18, 1952, Serial No. 304,941

1 Claim. (Cl. 74—711)

This invention relates to variable-torque-distributing transmissions.

Among the objects of the invention are to provide an improved variable-torque-distributing transmission to a plurality of transversely extending axles.

A further object is to provide an axle drive of the above type which includes a nut gear threaded on a threaded shaft gear.

A further object is to provide an improved axle drive of the above type which will be efficient in operation, rugged in construction, and relatively inexpensive to manufacture.

Further objects and advantages of the invention will be apparent from the description and claims.

In the drawings, in which an embodiment of the invention is shown,

Figure 1 is a fore-and-aft vertical axial sectional view of the improved transmission showing the main central drive shaft and the upper and lower bogie axle drives;

Fig. 2 is a vertical transverse section on the line 2—2 of Fig. 1;

Fig. 3 is a vertical transverse section on the line 3—3 of Fig. 1;

Fig. 4 is a vertical transverse section on the line 4—4 of Fig. 1;

Fig. 5 is a vertical transverse section on the line 5—5 of Fig. 1;

Fig. 6 is a vertical transverse section on the line 6—6 of Fig. 1;

Fig. 7 is a face view of one of the plate sections 9 of the planet pinion carrier as viewed from line 7—7 of Fig. 1;

Fig. 8 is a rear face view of another plate 9a of the planet pinion carrier viewed from the line 8—8 of Fig. 1;

Fig. 9 is a sectional view substantially on the line 9—9 of Figs. 3 and 4;

Fig. 11 is a vertical sectional view on the line 11—11 of Fig. 10, and

Fig. 12 is a sectional view on the line 12—12 of Fig. 11.

Figure 10:
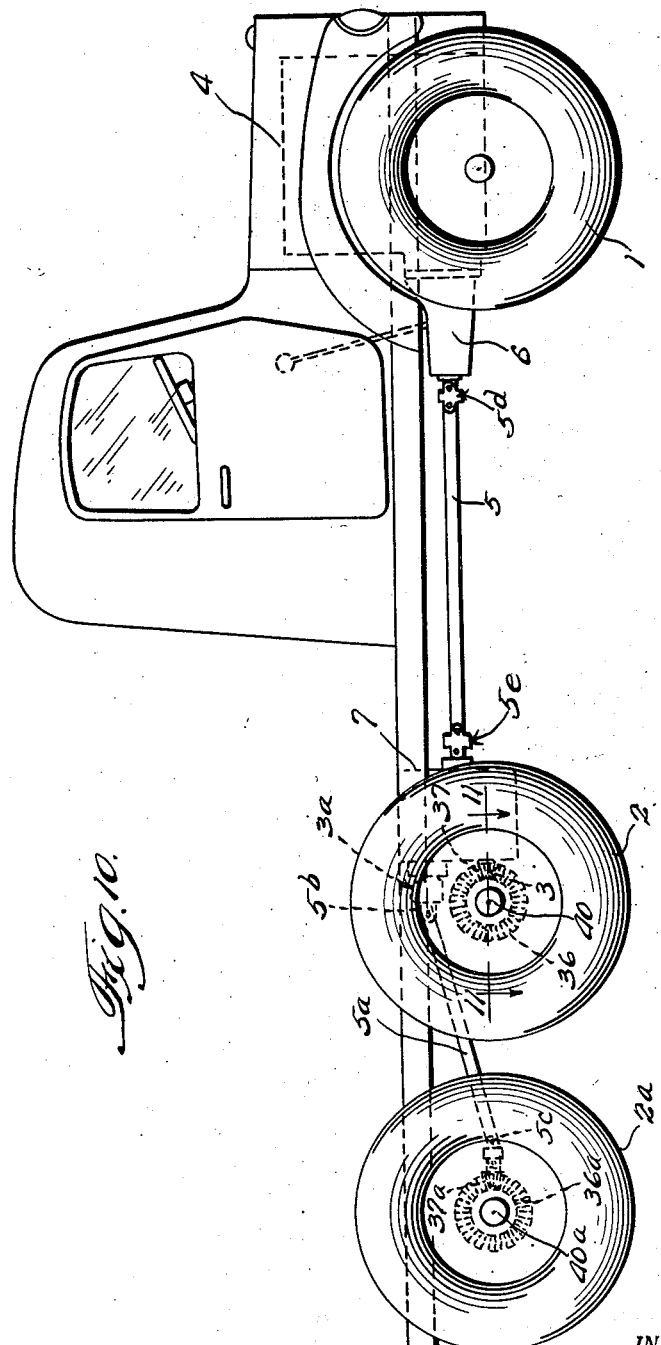
Fig. 10 is a side elevation showing a truck with a bogie axle drive.

The construction shown comprises a bogie axle truck comprising dirigible front road engaging wheels 1, rear drive wheels 2 and 2a, front and rear bogie axle drives 3 and 3a, each leading to a differential transmission, a motor 4, a propeller shaft 5, a variable speed and reverse transmission 6 between the motor and propeller shaft, and a main non-torque-equalizing differential transmission between the propeller shaft and the bogie axle drives 3 and 3a.

The main torque-equalizing differential transmission comprises a transmission housing 7, a drive shaft 8 rotatably mounted in said housing and driven from the propeller shaft, a planet pinion carrier, including four generally circular coaxial plate-like sections 9, 9a, 9b, and 9c, mounted on and rotatable with the drive shaft 8, planetary gearing 10, including two sets of differentially driven planet pinions mounted on said pinion carrier, two spur gears 11 and 12 coaxial with the drive shaft and driven from the planetary gearing 10, and transmission from the two spur gears 11 and 12 to the bogie axle drives 3 and 3a, respectively.

The transmission from the spur gear 11 to the front bogie axle drive 3 comprises a spur gear 13 coaxial with and splined to the spur gear 11 and a spur gear 14 meshing with the spur gear 13 and splined to the shaft 15 of the front bogie axle drive 3.

The transmission from the spur gear 12 to the rear bogie axle drive 3a comprises a spur gear 16 splined to and coaxial with the spur gear 12 and a spur gear 17 meshing with the spur gear 16 and splined to the shaft 18 of the rear bogie axle drive 3a.

Each of the two differentially driven sets of planet pinions comprises three similar sub-sets of planet pinions as indicated in Figs. 3, 4, and 5. One of the two sets serves to transmit equalized or nonequalized torque from the drive shaft 8 and the planet pinion carrier 9, 9a, 9b, and 9c to the coaxial spur gear 11 which, as indicated above, is splined to the spur gear 13 which meshes with the spur gear 14 of the front bogie axle drive and the other set serves to transmit equalized or non-equalized torque from the drive shaft 8 and planet pinion carrier to the other coaxial spur gear 12 which is splined to the spur gear 16 which meshes with the spur gear 17 of the rear bogie axle drive.

The three sub-sets which transmit torque from the pinion carrier to the spur gear 11 are similar and also the three sub-sets which transmit torque from the pinion carrier to the spur gear 12 are similar. One of the sub-sets which transmits torque to the gear 11 will first be described.

This sub-set comprises a duplex planet pinion gear 19 (see Figs. 1, 3, 4, 5, and 9) having journals 20 and 21 rotatably mounted in the pinion carrier plates 9 and 9b. One of the pinions 22 of the duplex gear 19 meshes with the spur gear 11, Fig. 5. The other pinion 23 of the duplex gear meshes with an internally threaded planet pinion 24, Fig. 4, forming part of one of the three sub-sets which transmits torque to the spur gear 12.

This last sub-set comprises, in addition to the pinion 24, a planet pinion 25, Figs. 3 and 9, having journal portions 26, 27, and 28 rotatably mounted in bearings in the planet pinion carrier plates 9a, 9b and 9c and having a threaded shaft portion 29, Figs. 1, 4, and 9, for engagement with internal threads in the planet pinion 24.

The two planet pinion carrier plates 9a and 9b are splined to the drive shaft 8 at 30. The four planet pinion carrying plates 9, 9a, 9b and 9c are secured to rotate as a unit by the bolts 31. The two coaxial gears 11 and 13 are splined together at 32, Figs. 1 and 6, and rotatable as a unit with the bearing sleeve 33 on the shaft 8. The two coaxial gears 12 and 16 are splined together at 34 and rotatable as a unit with the bearing sleeve 35 on the shaft 8.

Between section 3—3 and plate 9b are the threaded shaft pinions 25. Between section 4—4 and plate 9a are the duplex pinions 23 and the internally threaded pinions 24. Between section 5—5 and the plate 9 are the gears 22 and gear 11.

As stated above, the three sub-sets which transmit torque from the planet pinion carrier to the gear 11 are similar and the same reference characters have been applied to all three in the drawings. Also, the same reference characters have been applied to all of the three sub-sets which transmit torque to the gear 11.

NON-TORQUE EQUALIZING DIFFERENTIAL ACTION

*Equal speed of bogie axle drives.*—As will be explained in detail hereinafter, if conditions are such that the drive shaft 15 for the front bogie axle drive 3 is constrained to rotate at the same speed as the drive shaft 18 for the rear bogie axle drive 3a, the threaded relation between the nut pinions 24 and the externally threaded shafts of the pinions 25 will be such as to cause a releasing action between the nut pinion 24 and the co-operating clamping plates 9a or 9b (depending upon whether the central drive shaft 8 is being driven clockwise, as viewed in Fig. 2, for forward drive of the vehicle or counterclockwise for reverse drive).

*Unequal speed of bogie axle drives.*—If conditions are such, due for example, to the difference in diameter of the tires or to the condition of the roadway, that the drive shaft 18 for the rear bogie axle drive 3a is constrained to rotate at a different speed (either faster or slower than that of the drive shaft 15 for the front bogie axle drive 3), the threaded relation between the nut pinions 24 and the pinions 25 will be such as to cause clamping engagement between the nut pinion 24 and one or the other of the pinion carrier plates 9a or 9b, depending upon whether the drive is forward or reverse, enabling the planet pinion carrier 9, etc., to adjust itself to equalize the torque transmitted to the bogie axle drive shafts 15 and 18.

POWER FLOW

The power flow from the control drive shaft 8 to the front bogie axle drive 3 may be traced by the line of arrows A, from the drive shaft 8 through the united planet carrier plates 9 and 9b, duplex gears 19 journalled thereon (including the coaxial united pinions 23 and 22, Fig. 9), the pinion 23 meshing with the nut pinion 24, Fig. 4, the gear 11 meshing with the pinion 22, Fig. 5, the gear 13 splined at 32 on the hub of gear 11, Fig. 1, and the gear 14 meshing with the gear 13 and splined on the shaft 15 for the front bogie axle drive 3.

The power flow from the control drive shaft 8 to the rear bogie axle drive 3a may be traced from the planet carrier plates 9, etc., by the line of arrows B, through the threaded shaft pinion 25, journalled in the carrier plates 9a, 9b, and 9c, spur gear 12 meshing with the threaded shaft pinion 25, spur gear 16 splined at 34 on the hub of the gear 12, spur gear 17 meshing with the spur gear 16, and shaft 18 on which the spur gear 17 is splined and which drives the rear bogie axle drive 3a.

BOGIE AXLE DIFFERENTIAL

This differential is in general similar to that shown in the patent to Randall No. 2,481,873, dated September 13, 1949. Each of the divided axles may be provided with its own non-torque-equalizing differential, though this may not always be necessary or advisable.

Referring to the drawings in detail, this construction (shown in Figs. 1, 10, 11, and 12 for the front bogie axle) comprises a rotatable gear carrier 35 which may be driven through the bevel gear 36 from the pinion 37 on the propeller shaft 15 of the front bogie axle drive, two spur gears 38 and 39 coaxial with the rotatable gear carrier 35 and rotatably mounted with respect thereto, to which the axle sections or parts 40 and 41 of the ground engaging wheels 2a may be splined, respectively, and transmission between said gear carrier 35 and axle spur gears 38 and 39 comprising a plurality of pairs of spur gears, one gear 42 of each pair meshing with the axle gear 38 and the other gear 43 of each of said pairs meshing with the other axle gear 39, a plurality of externally threaded shafts 44 rotatable, respectively, with one of the spur gears 42, a plurality of internally threaded spur gears 45, one threaded on each shaft 44, a plurality of spur gears 46 meshing, respectively, with said internally threaded spur gears 45 and rotatable, respectively, with the gears 43, and means for limiting the threading movement of said threaded gears 45 on said threaded shafts 44 to lock the threaded gears and threaded shafts to the gear carrier 35.

The gears 46 and 43 are keyed to the shafts 47. The gear carrier 35 comprises two end bearing plates 48 and 49 and two intermediate bearing plates 50 and 51. The shafts 44 and 47 are journalled in bearings 52 in these bearing plates 48, 49, 50, and 51. These bearing plates are also provided with suitable antifriction thrust collars or washers 54. The gears 38 and 39 are also provided with suitable antifriction collars 54.

In order to prevent oil leakage and in order to stiffen up the construction, a suitable cylindrical shell 55 may be slipped over the bearing plates 50 and 51 and clamped in position between the flanges of the plates 48 and 49. The bevel gear 36 may be held in position on the plate 48 by means of suitable rivets 56, or the like.

In use, if one ground-engaging wheel has traction and the other does not and power is being applied to turn the gear carrier 35, the threaded gears 45 will rotate slightly, due to the road resistance of the ground wheel which has traction until each of these internally threaded gears 45 has rotated sufficiently to cause it to clamp one or the other of the bearing plates 51 or 50 between either the shouldered collar 57 or the shouldered gear 42 to lock the internally threaded gear 45, the gears 46 and 43, the threaded shaft 44 and the gear 42 against further rotation with respect to the gear carrier. Further driving force of the gear carrier will be transmitted directly to the axle gear and axle part (40 or 41) of that wheel which has traction, through one or the other of the locked spur gears 42 or 43, regardless of the fact that one of the ground-engaging wheels has no tractive effect.

When both ground wheels have tractive effect and the vehicle is travelling a straight course, power will be transmitted equally to both ground wheels. If the vehicle is going around a corner and one or the other of the ground-engaging wheels has to precess, the driving effort will still be transmitted equally to both wheels, the gear carrier 35 precessing as required with respect to the lagging ground wheel.

GENERAL VARIABLE TORQUE DISTRIBUTING ACTION

It follows from the construction described that the overall variable torque distribution to the four drive wheels 2a is such that if any one of them has good nonslipping ground engagement and none of the other three wheels has, the major portion of the torque from the propeller shaft 5 will be transmitted to that drive wheel which has good nonslipping ground engagement. If any two wheels have good nonslipping engagement and the other two do not, the major portion of the torque will be transmitted to the two wheels which have good ground engagement. If three wheels have good ground engagement, a proportion of torque will be transmitted to the fourth wheel depending on the pitch of the internally threaded gears 45.

DETAILS

The transmission housing 7 (Figs. 1 and 2) comprises a housing 58 having an integral head 59 at its rear end and a detachable head 60 at its front end, in which housing the main torque distributing transmission is mounted. The front head 60 may be secured to the receptacle by means of cap screws 61. The three parallel shafts 8, 15, and 18 are mounted in antifriction bearings 62 and 63 in the front and rear bearing supporting heads or plates 59 and 60, respectively.

The journals 26, 27, and 28 are mounted in antifriction radial and end pressure bearings 64 in the planet pinion plates 9, 9a, 9b and 9c (see Fig. 9). These plates 9a, 9b and 9c are held together by means of the bolts or cap screws 31 extending through openings 31a in these plates (Figs. 1, 3, 4, 5, 7, and 8). The plate 9a is provided with radially open notches 65 to enable the assembly of the duplex planet gears 19 by radial insertion of the necks 66 of these gears into the notches. The threaded shaft 29 and the planet pinion 25 are held against axial movement by a collar 27 surrounding and secured to the shaft.

The drive for the rear bogie axle sections 40a is substantially the same as that described in connection with the front bogie axle sections 40 and 41. The gear 36a and pinion 37a which drive the rear axle sections 40a correspond to the gear 36 and pinion 37 which drive the front axle sections 40 and 41, as shown in Fig. 10. The drive from the rear bogie axle drive 3a to the pinion 37a is through the drive shaft 5a which has suitable universal joint connections 5b, 5c, with the rear bogie axle drive 3a and rear bogie axle drive pinion 37a.

The main propeller shaft 5 may have universal joint connection at 5d and 5e with the transmission 6 and main drive shaft 8, respectively.

Further modifications will be apparent to those skilled in the art and it is desired, therefore, that the invention be limited only by the scope of the appended claims.

Having thus described my invention, what I claim and desire to secure by Letters Patent is:

A differential comprising a drive shaft, a planet pinion carrier rotatable with said drive shaft, planetary gearing mounted on said gear carrier, two gears coaxial with said drive shaft and rotatable with respect thereto, and two gears rotatable with the coaxial gears, respectively, said planetary gearing comprising an internally threaded pinion and a pinion having a threaded shaft threaded into the first said pinion and brought into rotation retarding position with respect to said gear carrier by relative rotation of said pinions and force-transmittent means between one of said two pinions and one of said second two gears, the other pinion meshing with the other of said second two gears, said force-transmittent means comprising duplex planet pinion having one pinion portion meshing with said one of said two pinions and its other pinion portion meshing with said one of said second two gears, said gear carrier comprising two generally circular end plates and two generally circular intermediate plates coaxial and keyed to said drive shaft, said internally threaded pinion being mounted between said intermediate plates, said threaded shaft pinion being mounted between one of said intermediate plates and an end plate, one duplex pinion portion being mounted between said intermediate plates and meshing with said internally threaded pinion and the other dulex pinion portion being mounted between the other end plate and an intermediate plate, the axes of said internally threaded pinions and threaded shafts extending parallel to the axis of said drive shaft.

References Cited in the file of this patent
UNITED STATES PATENTS

| | | |
|---|---|---|
| 1,643,476 | Thorp | Sept. 27, 1927 |
| 1,716,073 | McFarlane | June 4, 1929 |
| 1,956,583 | Morgan | May 1, 1934 |
| 2,102,314 | Fraser | Dec. 14, 1937 |
| 2,309,441 | Cook | Jan. 26, 1943 |
| 2,445,760 | Buckendale | July 27, 1948 |
| 2,481,873 | Randall | Sept. 13, 1949 |
| 2,536,392 | Randall | Jan. 2, 1951 |
| 2,603,108 | Carlson | July 15, 1952 |